B. J. MILLER.
MILKING MACHINE.
APPLICATION FILED APR. 20, 1917.
1,286,052.
Patented Nov. 26, 1918.
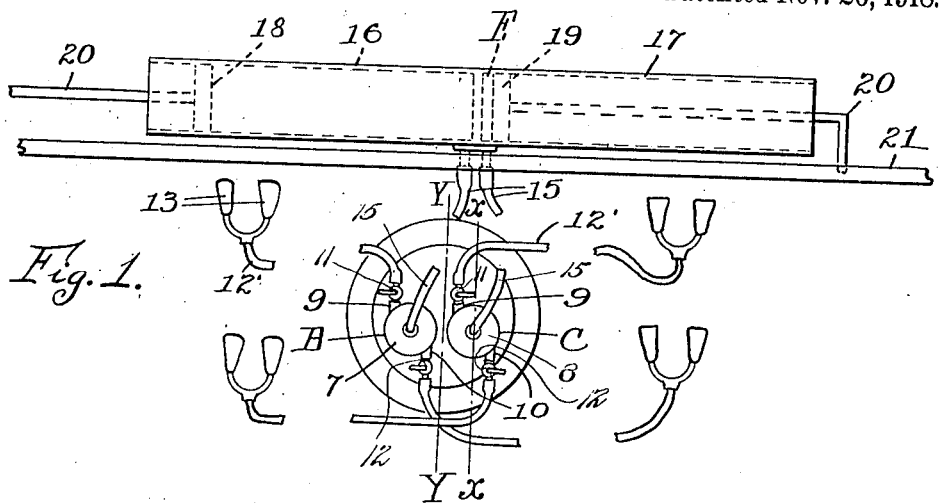
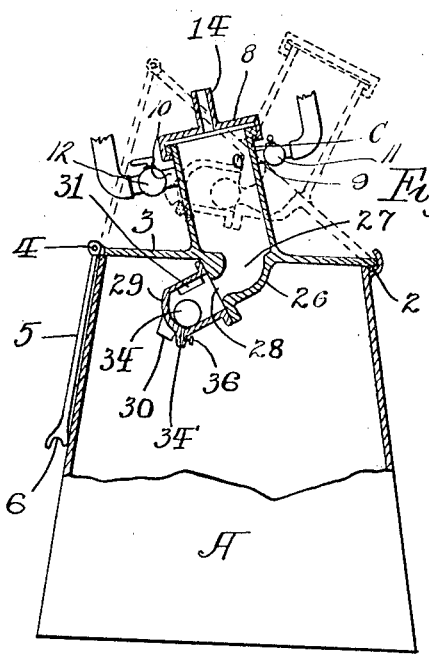
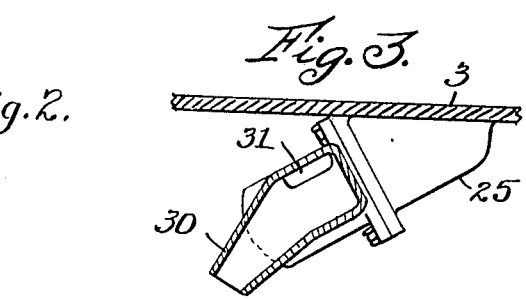
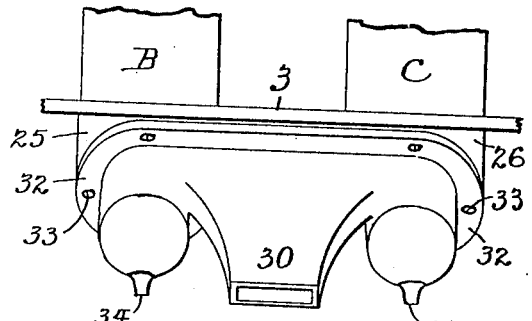
Inventor:
Benjamin J. Miller.
by: H. S. Bradbury,
Attorney.

UNITED STATES PATENT OFFICE.

BENJAMIN J. MILLER, OF ST. PAUL, MINNESOTA.

MILKING-MACHINE.

1,286,052.

Specification of Letters Patent. Patented Nov. 26, 1918.

Application filed April 20, 1917. Serial No. 163,516.

*To all whom it may concern:*

Be it known that I, BENJAMIN J. MILLER, a citizen of the United States, residing at St. Paul, in the county of Ramsey and State of Minnesota, have invented a new and useful Improvement in Milking-Machines, of which the following is a specification.

This invention relates to milking machines with which a pulsating device is employed for alternately drawing milk from two sets of teats by the employment of teat cups. More particularly this invention is of that class in which a pump is employed in coöperation with a milk receiving chamber for producing the above results. In the case above referred to it is desirable to so construct the milking apparatus, whereby it will automatically stop milking when the flow of milk from the cow ceases. This and other advantages which will be apparent from the following description are accomplished by my invention, and to these ends my invention comprises the features of construction and combinations of parts hereinafter more particularly described and claimed.

In the accompanying drawing forming part of this specification, Figure 1 is a diagrammatic view of my invention, part of the apparatus being broken away and in detail; Fig. 2 is a side elevation partly in vertical section taken on the line X—X of Fig. 1; Fig. 3 is a section of a detail taken on the line Y—Y of Fig. 1, and Fig. 4 is a front elevation of a detail.

In the drawing A indicates a milk receiving receptacle upon which is separably coupled by means of the hinge 2 a cover 3 having hingedly secured thereto at 4 a prop 5 in the form of an arm having its free end formed with a notch 6 which is adapted to engage the rim of the receptacle A to support the cover in open inclined position as illustrated by the broken lines. Formed integral with the cover 2 and stationed side by side are two milk receiving chambers B and C, which in the normal or closed position of the cover incline slightly forward and are provided with caps 7 and 8, which are detachably coupled respectively to the upper end of the said chambers B and C. Each of said chambers is provided in its body portion with a pair of milk receiving ducts 9 and 10 and valves 11 and 12, which control the opening and closing of said ducts. These ducts have connected thereto the usual milking flexible tubes 12' (see Fig. 1) which carry upon their outer free ends the usual pairs of teat cups 13. Thus there are two sets of milking tubes 12 shown connected with each milk receiving chamber. Each of the caps 7 and 8 is provided with a nipple 14, over which a flexible air suction tube 15 is connected. The air suction tube which is connected with the nipple on the cap 7 is also connected with one cylinder 16 of a double suction pump or pulsator E, while the other tube which is connected with the cap 8 is also connected with the companion cylinder 17. The cylinders 16 and 17 are integral and co-axially arranged. They contain reciprocable pistons 18 and 19 which reciprocate alternately resulting in alternate air exhaust pulsations produced in the milk receiving chambers B and C, and cause the milking tubes to alternately draw milk through their respective pairs of teat cups. The pistons 18 and 19 have the usual piston rods 20, which are adapted to be driven in unison by any suitable actuating means, a detail of a reciprocable shaft 21 being illustrated in the drawing for that purpose.

Depending from the cover 3 are two fittings 25 and 26, each having a passage 27 terminating in a valve seat 28 below each of the milk receiving chambers. The plane of the valve seat face of each fitting inclines downwardly and backwardly and to said face of each fitting is secured a valve holding cup 29, the two cups thus provided being integral and formed with an intemediately disposed milk discharging spout 30, which is connected with each of said valve cups by means of an overflow duct 31. The valve cups are formed with a flange 32 through which screws 33 secure the cups upon the valve seat fittings 25 and 26. Placed in each of the valve cups is a freely disposed valve 34, which as illustrated is in the form of a hollow ball made of rubber or other suitable material, so that the valves will float in the milk which is received in the valve cups. The arrangement of each valve cup and the inclination of the valve seat in connection with each of the milk receiving chambers is such that the valve floating in the milk which is received in each milk cup automatically approaches the valve seat, so that it will respond quickly to the current of air exhausted from the milk chambers B and C produced by the pump and close the passage through the valve seat, thereby causing milk to be drawn through the teat cups. Arranged in the lower extremity of each valve cup is a small port 34', which will gradually allow milk to escape from the valve cup, but which is not sufficiently large to materially effect the suction on the teat cups, so long as milk is flowing freely from the cow. When however the flow of milk from the cow ceases, the milk in the valve cup escapes through the port 34' and allows the valve to rest in the lower portion of said cup, so that it will not respond to the suction action exerted by the pump. When in this condition air is drawn freely through the spout 30, and there is little or no force exerted by the pump through the teat cups. The overflow ports 31 are arranged at sufficient elevation in the valve cups, so that the valves when floating upon the surface of the milk in the valve cups will move into closing position under the action of suction, but during each alternate action of the piston the slightest pressure will cause the valve to become unseated and allow the milk in the milk receiving chamber to flow downwardly into the valve cup and overflow out through the spout 30. The size of the port passage 34' may be regulated or closed when desired by means of a thumb screw 36.

In starting the apparatus, the cover 3 is raised into the broken line inclined position illustrated in Fig. 2 in which position it is supported by means of the prop 5, the lower end of which engages over the rim of the milk receiving receptacle A. In this position the valve 34 rolls downwardly against the valve seat and in this position the slightest suction exerted by the pump will cause the valve to close the valve seat and passage 27 when substantially no milk is in the milk cup. As soon as the flow of milk from the cow starts through the teat cups, the cover 3 is closed and the alternate opening and closing of the valves on their seats continues until the flow of milk from the cow ceases, whereupon the suction action upon the teats is automatically checked in the manner above stated. The apparatus described is simple and inexpensive in construction. It can be easily cleaned and is therefore sanitary. It can be easily primed or started in the manner described, and it can be easily changed so as not to operate automatically to check the suction upon the teats when the flow of milk stops. The valve cups can be easily detached for cleaning or repairing by removing the screws 33 and disconnecting the valve cups and spout fixture and the cover 3 can be easily removed through the use of the separable hinge 2. The valves 34 being in the form of balls provide evenly disposed wear surfaces upon the valve seats thus at all times producing tight joints and reducing the liability of the valves cutting or leaking.

In accordance with the patent statutes, I have described the principles of operation of my invention, together with the apparatus which I now consider to represent the best embodiment thereof, but I desire to have it understood that the construction shown is only illustrative, and that the invention can be carried out by other means and applied to uses other than those above set forth within the scope of the following claims.

Having described my invention, what I claim as new and desire to protect by Letters Patent is:—

1. A milking machine, comprising, in combination, a milk receiving receptacle, a milk receiving chamber associated with said receptacle having a passage entering said receptacle terminating in a valve seat, a milking tube connected with said chamber, means for exhausting air from said chamber, a valve cup placed over said valve seat having an orifice for the discharge of milk and means for draining milk therefrom when milk ceases to flow from the cow and a valve adapted to float in said cup into juxtaposition with said seat and to lower away from said seat out of range to be influenced by the current of air exhausted from said chamber when the milk is drained from said cup.

2. A milking machine, comprising, in combination, a milk receiving receptacle, a milk receiving chamber associated with said receptacle having a downwardly extending passage terminating in a valve seat, means for exhausting air from said chamber, a milking tube connected with said chamber, a valve holding cup arranged over said seat having a milk overflow duct and a milk draining passage for the escape of milk from the bottom of said cup and a valve in said cup arranged to automatically close upon said seat, said valve being urged into closed position by milk received and held in said cup and prevented from closing when the milk in the cup is drained.

3. A milking machine, comprising, in combination, a milk receiving receptacle, a milk receiving chamber associated with said receptacle having a valved air ingress passage through which the milk is adapted to enter said receiving receptacle, means for exhausting air from said chamber, a milking tube connected with said chamber and means for rendering the valve ineffective to close said valved passage, so that when milk ceases to flow through said milking tube into said chamber, the suction of air through said tube into said chamber automatically ceases.

4. A milking machine, comprising, in combination, a milk receiving receptacle, a milk receiving chamber associated with said receptacle having a passage entering said receptacle terminating in a valve seat, a milking tube connected with said chamber, means for exhausting air from said chamber, a valve cup placed over said valve seat having an orifice for the discharge of milk and adjustable means for draining milk therefrom when milk ceases to flow from the cow and a valve adapted to float in said cup into juxtaposition with said seat and to lower away from said seat out of range to be influenced by the current of air exhausted from said chamber when the milk is drained from said cup.

5. A milking machine, comprising, in combination, a milk receiving receptacle, a cover tiltingly mounted on said receptacle having a milk receiving chamber, said chamber having a passage entering said receptacle terminating in a valve seat, a milking tube connected with said chamber, means for exhausting air from said chamber, a valve cup placed over said valve seat having an orifice for the discharge of milk and adjustable means for draining milk therefrom when milk ceases to flow from the cow and a valve adapted to float in said cup into juxtaposition with said seat when the cup is filled with milk or said cover is tilted up and to lower away from said seat out of range to be influenced by the current of air exhausted from said chamber when the milk is drained from said cup and said cover is in lowered position.

6. A milking machine, comprising, in combination, a milk receiving receptacle, a cover tiltingly mounted upon said receptacle, means for supporting said cover when raised into tilted position, milk receiving chambers on said cover having passages leading downwardly into said receptacle terminating at their lower ends in valve seats, a fitting detachably secured to said cover having cups over said valve seats, overflow ducts from said cups into said receptacle and drain ducts from said cups into said receptacle, and float valves held in said cups adapted to close upon said seats when air is exhausted from said chamber and milk is in said cups or when said cover is tilted up, said valves being inactive to close upon said seats when milk ceases to be drawn through said milking tubes into said chambers and is drained from said cups.

In testimony whereof, I have signed my name to this specification.

BENJAMIN J. MILLER.

Copies of this patent may be obtained for five cents each, by addressing the "Commissioner of Patents, Washington, D. C."